Patented Feb. 1, 1938

2,106,876

UNITED STATES PATENT OFFICE 2,106,876

AZO DYESTUFFS

Friedrich Schubert, Leverkusen-I. G. Werk, Germany, assignor to General Aniline Works, Inc., New York, N. Y., a corporation of Delaware No Drawing. Application March 30, 1936, Serial No. 71,797. In Germany April 4, 1935

9 Claims. (Cl. 260—70)

The present invention relates to new azodyestuffs, more particularly it relates to dyestuffs which may be represented by the general formula:

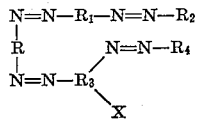

In the said general formula X is a member of the group consisting of hydrogen and $N=N-R_5$, and R stands for a radical of the benzene series or of the 1,1'-diphenyl series bearing the azo groups in the 4,4'-positions, such as the benzene nucleus, which may be substituted, for example by alkyl, halogen, the sulfonic acid group and the carboxylic acid group, or a diphenyl which may bear substituents, such as alkyl, alkoxy, halogen, the nitro group, the sulfonic acid group and the carboxylic acid group, $R_1$ stands for the radical of a naphthol sulfonic acid, capable of coupling twice, such as for aminonapththol sulfonic acids or dihydroxynaphthalene sulfonic acids, $R_2$, $R_4$ and $R_5$ stand for aromatic radicals which may bear substituents, such as alkyl, alkoxy, the nitro group, halogen, the sulfonic acid group and the carboxylic acid group, and which may contain an azo group, $R_3$ stands for a radical of a 1,3-dihydroxy compound of the benzene series.

Those of the above identified dyestuffs, in which R stands for a radical of the benzene series, are obtainable by combining in either order one molecular proportion of a naphthol sulfonic acid capable of coupling twice, with one molecular proportion of a diazo compound of the benzene series containing a group which is convertible into an amino group, such as for instance a nitro group, and with one molecular proportion of any diazo compound, one of these couplings being effected in an acid, the other coupling in an alkaline medium, then converting into the amino group the group above specified, subsequently diazotizing, coupling in an alkaline medium with one molecular proportion of a 1,3-dihydroxybenzene compound and then with one molecular proportion of a monodiazo compound or either at the same time or successively with two molecular proportions of the same or different monodiazo compound.

Those of my new compounds of the above formula, in which R stands for a diphenyl radical, are obtainable by combining in either order one molecular proportion of a naphthol sulfonic acid capable of coupling twice, with one molecular proportion of a tetrazotized 4,4'-diaminodiphenyl compound and one molecular proportion of any diazo compound, whereby the first coupling is performed in an acid medium, the second in an alkaline medium, then combining with one molecular proportion of a 1,3-dihydroxy compound of the benzene series and coupling the polyazo dyestuff formed with one molecular proportion of a monodiazo compound, or either at the same time or successively with two molecular proportions of 15 the same or of different monodiazo compounds.

The dyestuffs thus obtained are especially adapted for dyeing leather, yielding in general brown to blackish brown shades and they are particularly distinguished by their good fastness to acids and alkalies, and by their giving full and subdued shades.

The invention is illustrated by the following examples without being restricted thereto:

*Example 1.*—184 kgs. of benzidine are tetrazotized in the known manner and combined, in an acid medium, with 363 kgs. of the sodium salt of 1,8-aminonaphthol-3,6-disulfonic acid. When the formation of the monoazo dyestuff is complete, 209 kgs. of p-sulfanilic acid (dihydrate) are diazotized and added, and coupling is effected in a medium alkaline with sodium carbonate.

After the coupling is complete, a solution of 110 kgs. of resorcinol is added to the dyestuff formed. After this, to the coupling mixture a diazo solution prepared from 138 kgs. of p-nitraniline is added, when the reaction of the diazo compound disappears after about 10 minutes. After the addition of a further solution of 375 kgs. of sodium carbonate in about 1400 litres of water, finally another diazo solution prepared from 138 kgs. of p-nitraniline is added. This final coupling is complete after stirring overnight. The next morning neutralization is effected and the whole rendered weakly acid to acetic acid, and the dyestuff is salted out with 10% of sodium chloride, the percentage being calculated on the coupling volume, and then the dyestuff is pressed.

The dyestuff corresponds to the following formula:

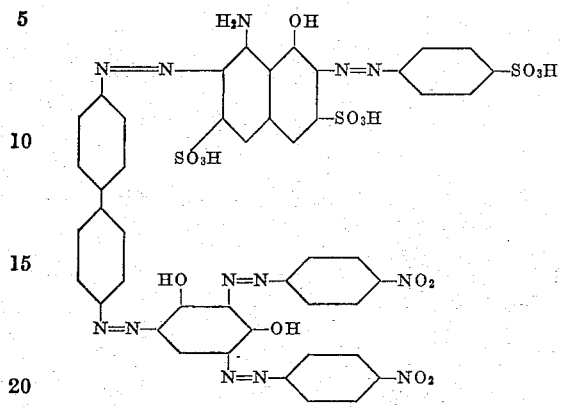

It forms, when dried, a greyish black powder, which dissolves in water with a deep brown coloration in concentrated sulfuric acid with a greyish blue coloration.

*Example 2.*—In accordance with the indications of Example 1, 184 kgs. of benzidine are tetrazotized and first, in an acid medium, combined with 363 kgs. of the sodium salt of 1.8-aminonaphthol-3,6-disulfonic acid, and then to the dyestuff formed a diazo solution prepared from 218 kgs. of 4-nitraniline-2-sulfonic acid is added. Coupling is effected in a medium alkaline with sodium carbonate and the formation of the trisazo dyestuff is completed by addition of 110 kgs. of resorcinol. Exactly as indicated in Example 1, coupling is continued first with the diazo compound prepared from p-nitraniline, and the final coupling is, after the addition of 375 kgs. of sodium carbonate, performed with the diazo compound prepared from 138 kgs. of p-nitraniline.

The dyestuff obtained, corresponding to the following formula:

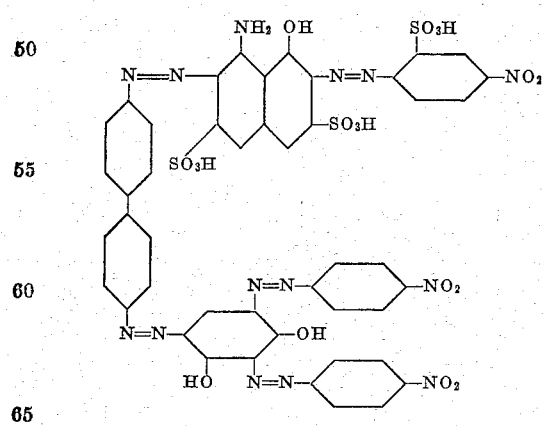

is soluble in water with a clearer brown coloration than that obtained with the dyestuff of Example 1, but otherwise it has the same dyeing properties.

Of course, the diazo compounds of the p-nitraniline and the 4-nitraniline-2-sulfonic acid mentioned in Examples 1 and 2 may be substituted by other diazotizing components, such as aniline disulfonic acids, naphthionic acid, naphthylamine disulfonic acids, chloraniline sulfonic acids, anisidine sulfonic acids, aminoazobenzene mono- or disulfonic acids and so on.

*Example 3.*—To the trisazo dyestuff obtained according to the directions of Example 1, formed by combining, in an acid medium, 363 kgs. of the sodium salt of 1,8-aminonaphthol-3,6-disulfonic acid with 1 mol. of tetrazotized benzidine and, in an alkaline medium, with the diazo compound prepared from 209 kgs. of p-sulfanilic acid (dihydrate), and by coupling with 110 kgs. of resorcinol, after this latter coupling is complete, a diazo solution prepared from 209 kgs. of p-sulfanilic acid (dihydrate) is added. This coupling is quickly complete. Then 375 kgs. of sodium carbonate dissolved in water are added to the coupling mixture and the final coupling is effected, after the addition of the diazo compound prepared from 138 kgs. of p-nitraniline, by stirring over night. The next morning the dyestuff is worked up according to the method described in Example 1. It corresponds to the following formula:

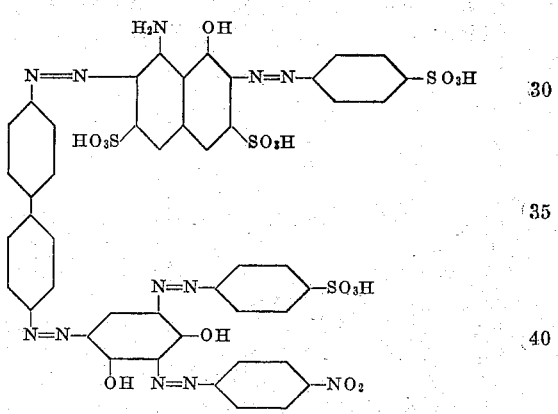

In comparison with the dyestuffs described in Examples 1 and 2, the dyestuff of this example yields essentially more olive shades likewise of good fastness to acids and alkalies.

The fact appears to be of particular interest that the shade of the dyestuffs obtained in accordance with this process can be changed not only by applying different diazotization components, which may be used for the final coupling with the trisazo dyestuff formed from benzidine, the sodium salt of 1,8-aminonaphthol-3,6-disulfonic acid, p-sulfanilic acid and resorcinol. The final components applied in Example 3, i. e. the p-sulfanilic acid and the p-nitraniline, may be substituted by others, as for instance by p-nitraniline disulfonic acids, and by anilines or aniline sulfonic groups substituted by chlorine, hydroxyl or alkoxy groups, by picramic acid, 1,3-diamino-4-nitrobenzene and so on. It seems to be of importance, however, what is the order of applying these two components for final diazotization. Thus not only the selection of the diazotizing components but also the order in which they are, one after another, allowed to act upon the trisazo dyestuff formed, gives a far-reaching possibility of varying the properties of the dyestuffs.

*Example 4.*—184 kgs. of benzidine are tetrazotized and combined, in an acid medium, with 285 kgs. of the sodium salt of 2-amino-5-naphthol- 7-sulfonic acid. When the formation of the monoazo-dyestuff is complete 209 kgs. of p-sulfanilic acid (dihydrate) are diazotized and added, and coupling is effected in a medium alkaline with sodium carbonate. After coupling is complete a solution of 110 kgs. of resorcinol is added to the dyestuff formed. When this step of the formation of the dyestuff is complete, to the coupling mixture a diazo solution prepared from 218 kgs. of 4-nitraniline-2-sulfonic acid is added, which latter disappears after a short duration of coupling. After a further solution of 375 kgs. of sodium carbonate in about 1400 litres of water is added, finally a diazo solution prepared from 138 kgs. of p-nitraniline is added. This coupling is complete over night. The next morning the dyestuff is salted out with 5% of sodium chloride while neutralizing at the same time until the reaction is only weakly alkaline, and then squeezed.

The dried dyestuff, corresponding to the following formula:

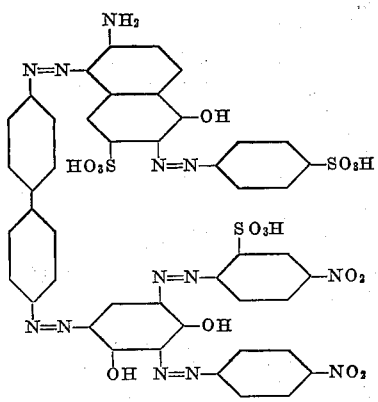

dissolves in water with a deep brown, in concentrated sulfuric acid with a blackish blue coloration.

It is obvious that far-reaching variations can be made in the shade of the dyestuffs manufactured in accordance with this process, by substituting the diazo compounds coupled to the fundamental structure of the dyestuff benzidine-azo-2-amino-5-naphthol-7-sulfonic acid - azo-resorcinol by suitable monodiazo or diazoazo compounds other than indicated in the example, as for instance by p-aminobenzoic acid, 1-hydroxy-4-aminobenzene-2-carboxylic acid, aniline sulfonic acids containing chlorine or hydroxyl or alkoxy groups, picramic acid, 1,3-diamino-4-nitrobenzene or aminoazobenzene-mono- or disulfonic acids. In this example also not only the selection of the diazotization components but the succession of their coupling presents a far-reaching possibility of varying the dyestuff properties.

*Example 5.*—285 kgs. of the sodium salt of 2-amino-5-naphthol-7-sulfonic acid are combined, in an acid medium, with the diazo compound prepared from 209 kgs. of p-sulfanilic acid (dihydrate). When the formation of the monoazo dyestuff is complete a tetrazo solution prepared from 184 kgs. of benzidine is added and the reaction mixture is rendered alkaline with sodium carbonate. When the coupling is complete a solution of 110 kgs. of resorcinol is added and coupling is effected in a medium alkaline with sodium carbonate. To the coupling mixture formed in this manner a diazo solution prepared from 218 kgs. of 4-nitraniline-2-sulfonic acid is added, which disappears after a short duration of coupling. After a further solution of 375 kgs. of sodium carbonate in about 1400 litres of water is added, finally a diazo solution prepared from 138 kgs. of p-nitraniline is added. This coupling is complete over night. The next morning the dyestuff is salted out with 5% of sodium chloride, while neutralizing at the same time until the reaction is only weakly alkaline, and then squeezed and dried. It corresponds to the following formula:

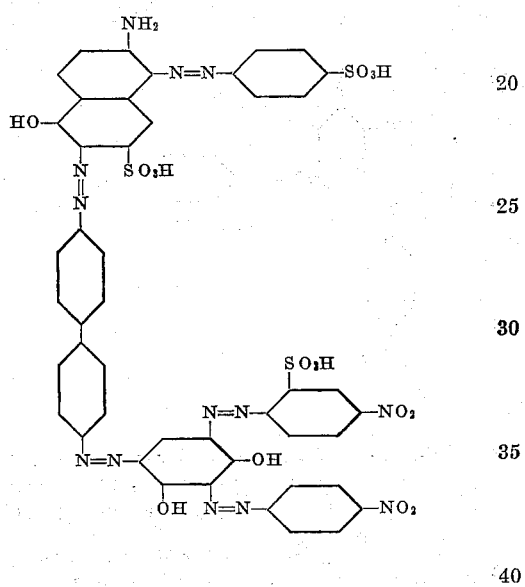

*Example 6.*—138 kgs. of p-nitraniline are diazotized in the known manner and combined, in an acid medium, with 285 kgs. of the sodium salt of 2-amino-5-naphthol-7-sulfonic acid. When the formation of the monoazo dyestuff is complete, there is added the diazo compound prepared from 209 kgs. of p-sulfanilic acid (dihydrate), and coupling is effected in a medium alkaline with sodium carbonate. After coupling is complete, a solution of about 420 kgs. of sodium sulfide is added to the coupling mixture, and the whole is stirred until the reduction of the nitro group is complete. Thereupon, for removing the sulfur, the dyestuff solution is rendered acid to Congo red, and the dyestuff which has been precipitated and squeezed off is dissolved in an aqueous solution of sodium carbonate and the solution filtered. To this solution a solution of about 70 kgs. of sodium nitrite is then added, the solution thus obtained is rendered acid to Congo red with hydrochloric acid, at a low temperature, and stirred until diazotization is complete. Thereupon a solution of 110 kgs. of resorcinol is poured into the diazotization mixture, and coupling is effected in a medium alkaline with sodium carbonate. When coupling is complete, there is poured into the coupling mixture a diazo solution prepared from 218 kgs. of 4-nitraniline-2-sulfonic acid, which disappears after a short duration of coupling. After the addition of a solution of about 350 kgs. of sodium carbonate in 1400 litres of water, finally the diazo solution prepared from 138 kgs. of p-nitraniline is added. Coupling is effected over night. The next day the dyestuff is salted out with about 10% of sodium chloride, while at the same time adding sodium carbonate until the reaction is weakly alkaline, and then it is pressed.

The dried dyestuff corresponding to the following formula:

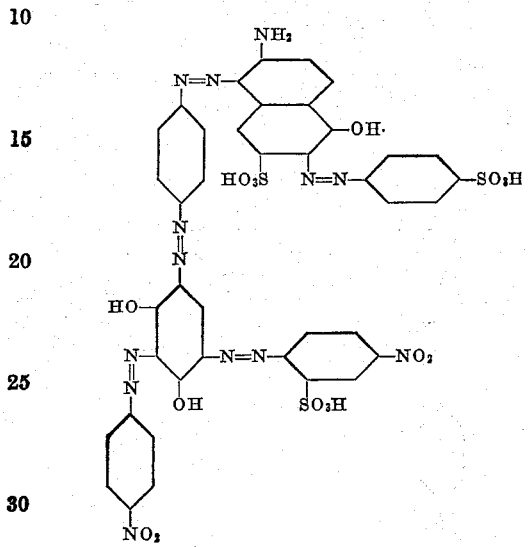

dissolves in water with a dark brown and in concentrated sulfuric acid with a black coloration and, on leather, it yields productive, full and subdued shades.

*Example 7.*—138 kgs. of p-nitraniline are diazotized in the known manner and coupled, in an acid medium, with 363 kgs. of the sodium salt of 1,8-aminonaphthol-3,6-disulfonic acid. When the coupling of this monoazo dyestuff is complete, 209 kgs. of p-sulfanilic acid are diazotized and the product added, and coupling is effected in a medium alkaline with sodium carbonate. After this coupling is complete, a solution of about 420 kgs. of sodium sulfide is added to the dyestuff, and the whole is stirred until the reduction is complete. This reduction mixture is rendered acid to Congo red with hydrochloric acid, and the dyestuff thereby separated is squeezed off and, for removing the sulfur, dissolved in a hot aqueous solution of sodium carbonate and filtered. After cooling, there is added to the filtrate a solution of 70 kgs. of sodium nitrite, the mixture is rendered acid to Congo red at a low temperature, and stirred until diazotization is complete. Thereupon a solution of 110 kgs. of resorcinol is poured into the diazotization mixture, and coupling is effected in a medium alkaline with sodium carbonate. When coupling is complete, to the coupling mixture a diazo solution prepared from 218 kgs. of 4-nitraniline-2-sulfonic acid is added, which latter component disappears after a short time. After a solution of about 350 kgs. of sodium carbonate in 1400 litres of water has been added, there is finally added a diazo solution prepared from 138 kgs. of p-nitraniline. Coupling is complete over night. The next day the dyestuff is salted out with about 10% of sodium chloride while at the same time adding sodium carbonate until there is a weakly alkaline reaction, and then squeezed.

The dyestuff corresponds to the following formula:

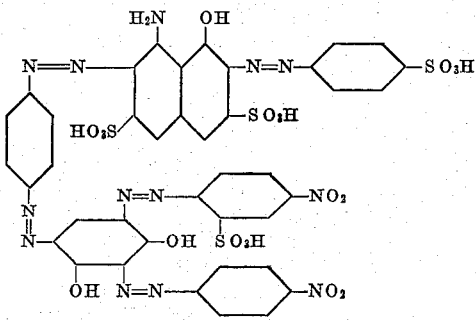

In the following table there are given further combinations prepared in accordance with the invention. All the dyestuffs mentioned therein are suitable for dyeing leather yielding brown to blackish brown shades. In the formulae of the table B means benzidine, Res. means resorcinol and the arrow (←) means "diazotized and coupled to".

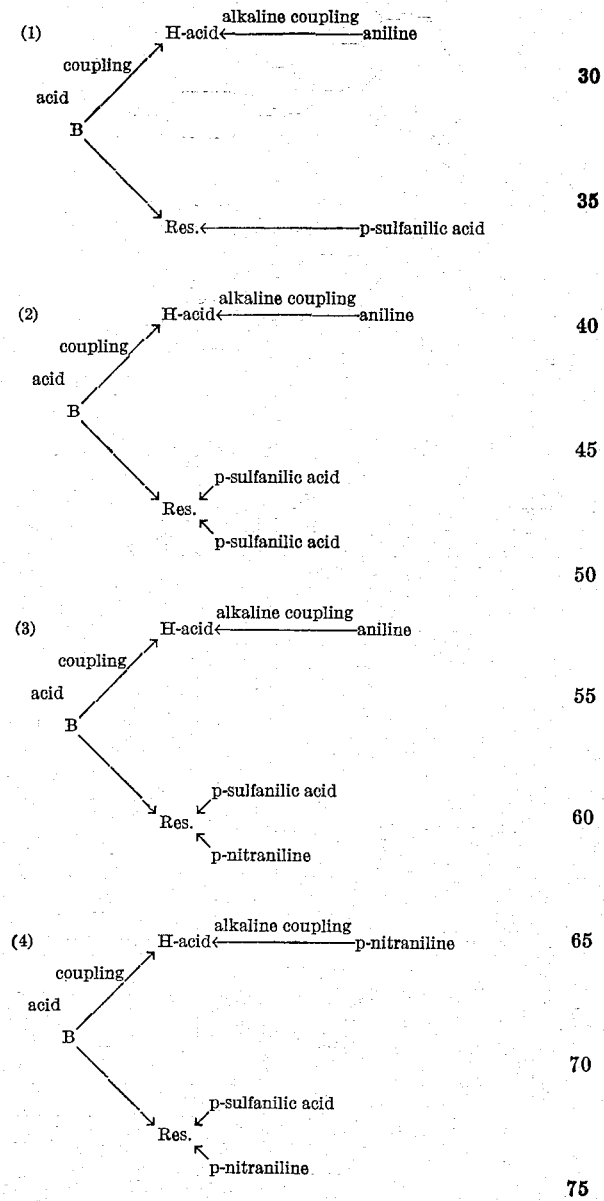

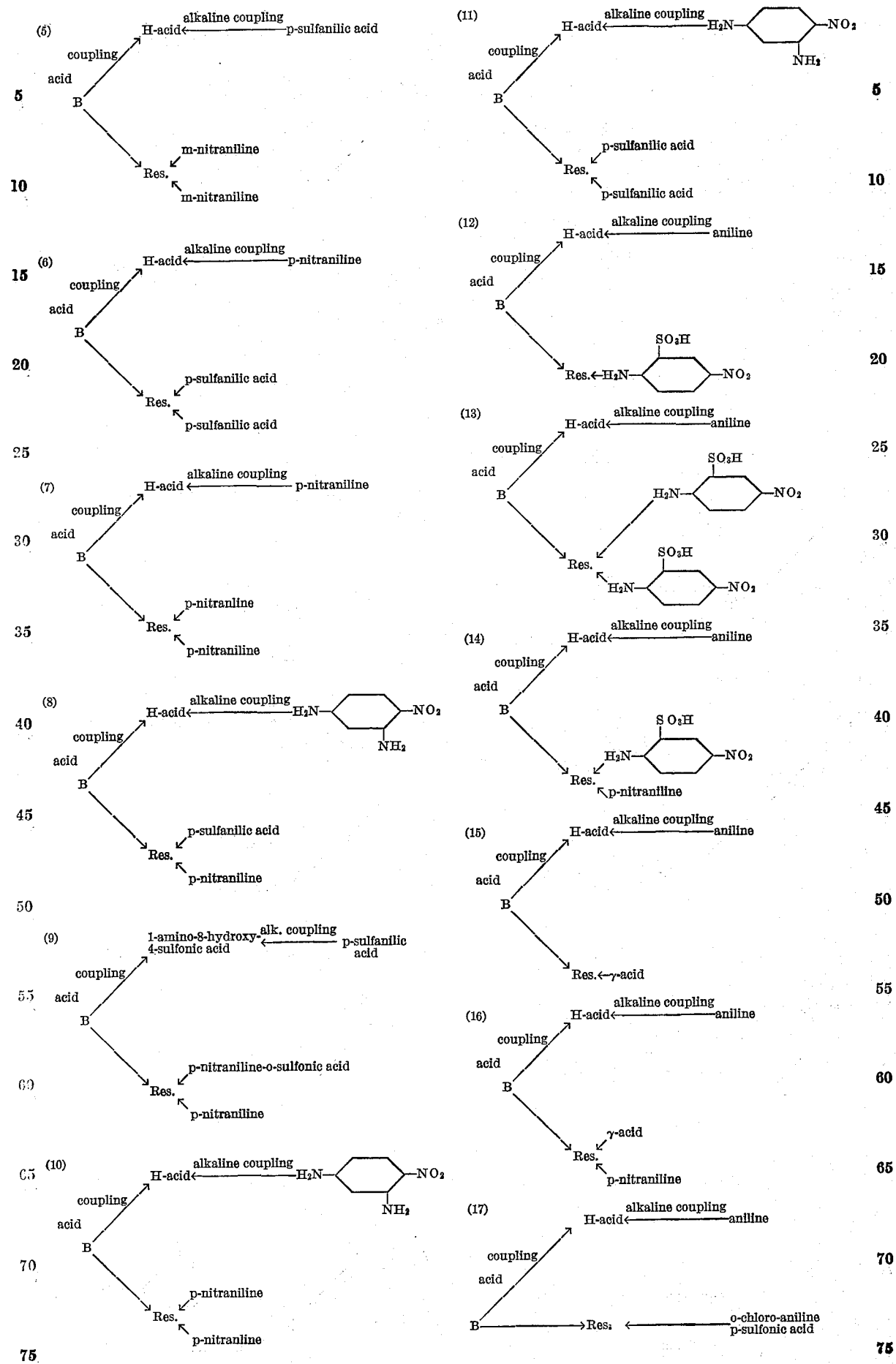

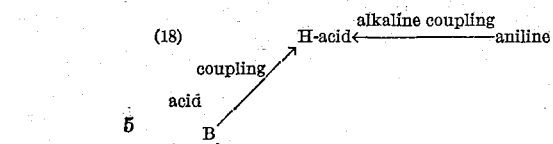
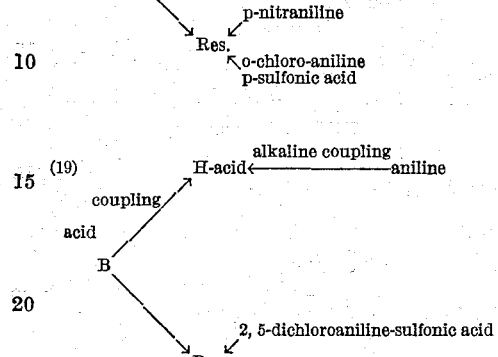
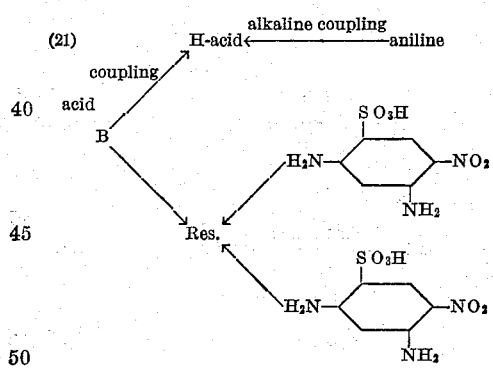
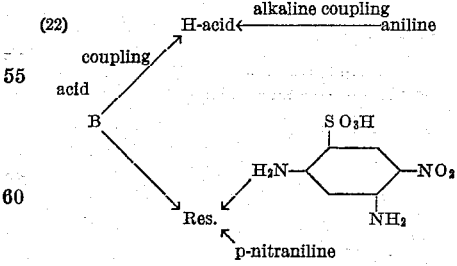
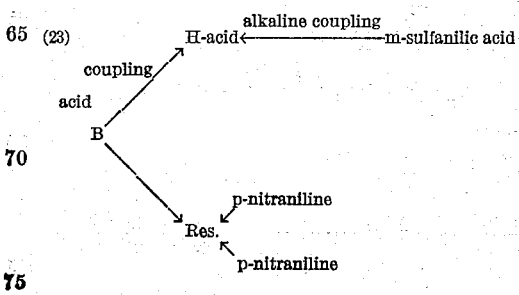
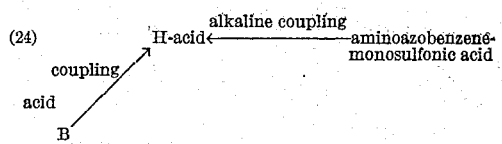
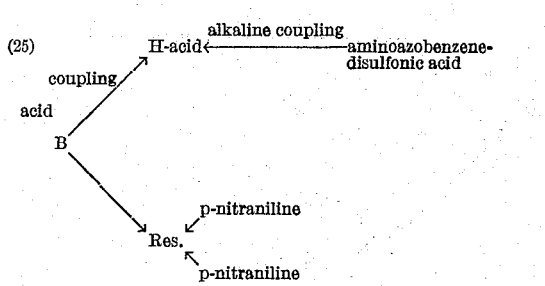
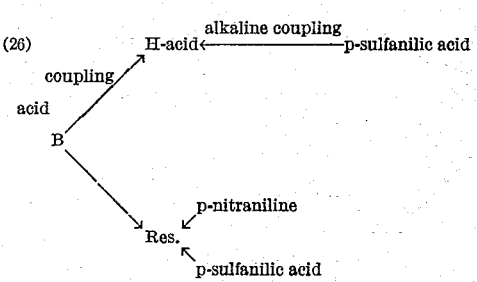
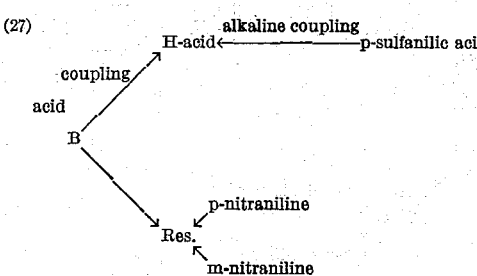
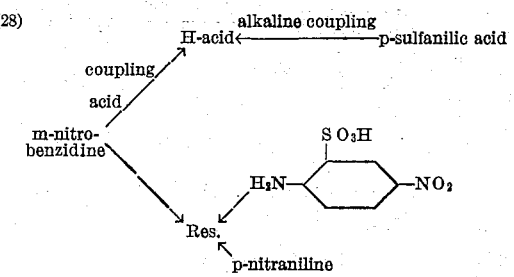
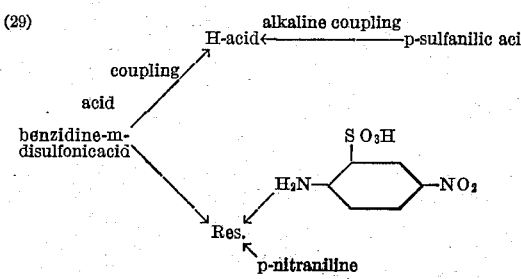

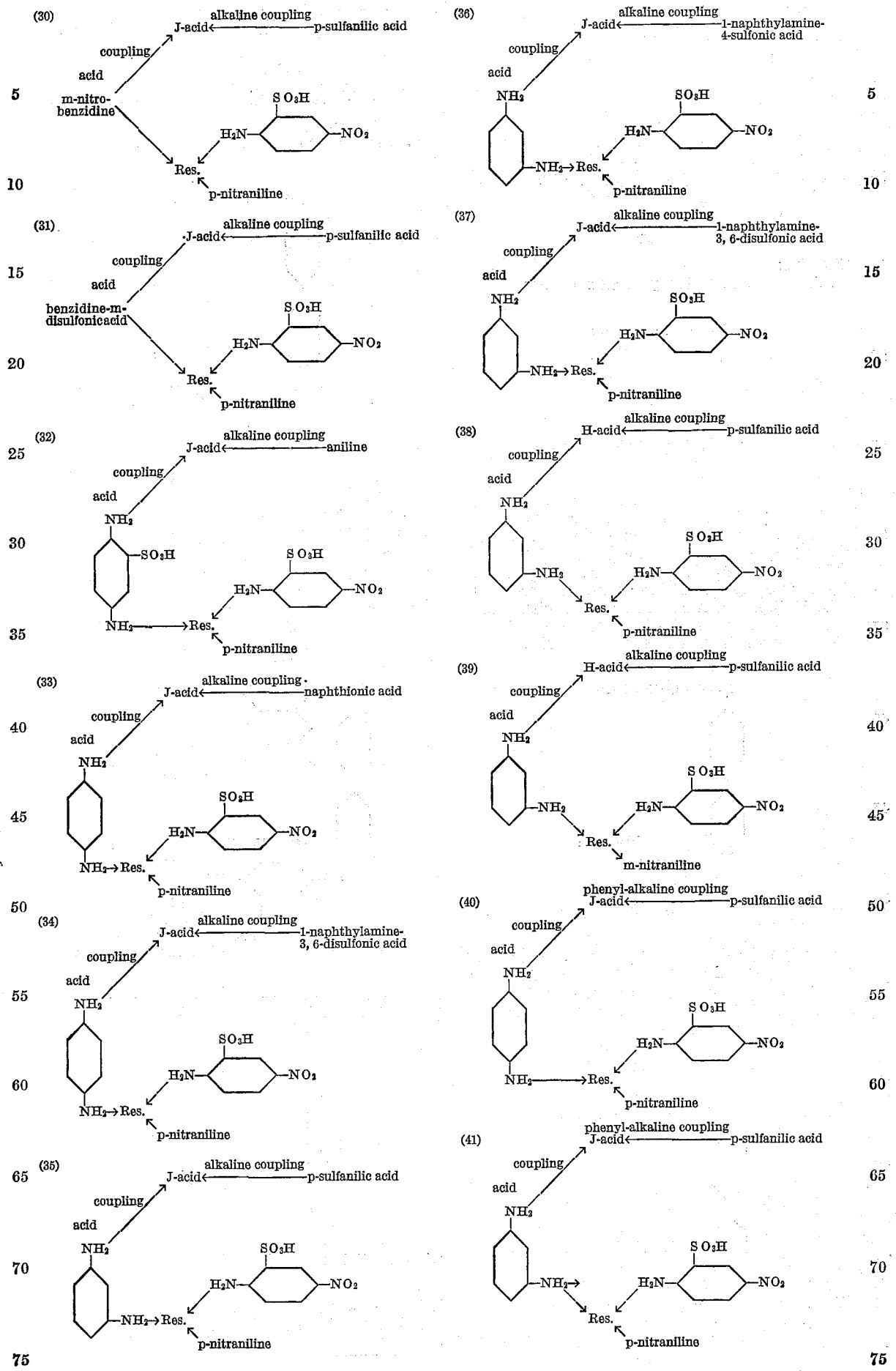

(42) 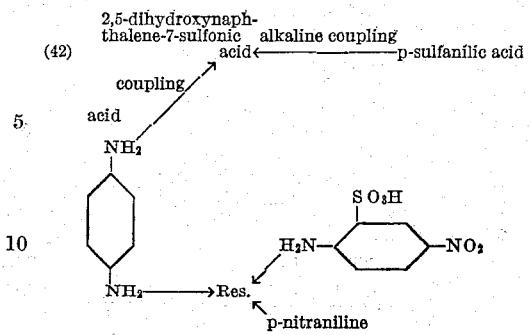

I claim:

1. Azodyestuffs of the general formula:

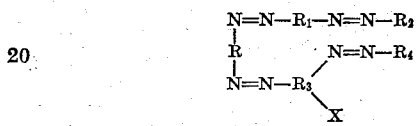

wherein X is a member of the group consisting of hydrogen and N=N—R5, and R stands for a radical selected from the group consisting of the benzene series and the 1,1'-diphenyl series, bearing the azo groups in the 4,4'-positions, R1 stands for a radical of a naphtholsulfonic acid capable of coupling twice, R2, R4 and R5 stand for aromatic radicals, R3 stands for a radical of a 1,3-dihydroxy compound of the benzene series, yielding on leather in general brown to blackish brown shades of good fastness properties.

2. Azodyestuffs of the general formula:

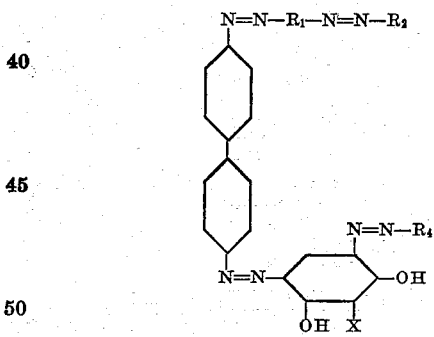

wherein X is a member of the group consisting of hydrogen and N=N—R5, and R1 stands for a radical of a naphtholsulfonic acid capable of coupling twice, R2, R4 and R5 stand for aromatic radicals yielding on leather in general brown to blackish brown shades of good fastness properties.

3. Azodyestuffs of the general formula:

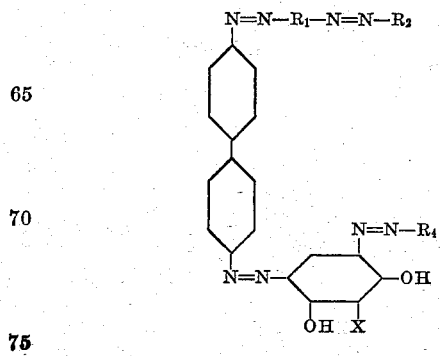

wherein X is a member of the group consisting of hydrogen and N=N—R5, and R1 stands for a radical of an aminonaphthol sulfonic acid capable of coupling twice, R2, R4 and R5 stand for aromatic radicals yielding on leather in general brown to blackish brown shades of good fastness properties.

4. Azodyestuffs of the general formula:

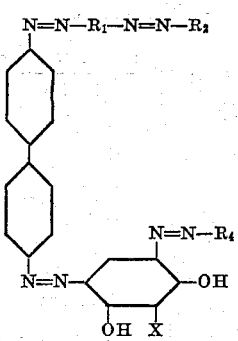

wherein X is a member of the group consisting of hydrogen and N=N—R5, and R1 stands for a radical of 2-amino-5-naphthol-7-sulfonic acid, R2, R4 and R5 stand for aromatic radicals yielding on leather in general brown to blackish brown shades of good fastness properties.

5. The dyestuff having in the free state the following formula:

yielding on leather blackish brown shades.

6. Azodyestuffs of the general formula:

wherein X is a member of the group consisting of hydrogen and N=N—R5, and R1 stands for a radical of a naphtholsulfonic acid coupling twice, R2, R4 and R5 stand for aromatic radicals, yielding on leather in general brown to blackish brown shades.

7. Azodyestuffs of the general formula:

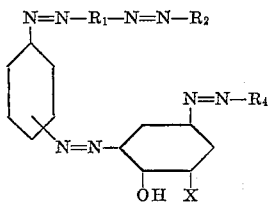

wherein X is a member of the group consisting of hydrogen and N=N—R₅, and R₁ stands for a radical of an aminonaphthol sulfonic acid coupling twice, R₂, R₄ and R₅ stand for aromatic radicals, yielding on leather in general brown to blackish brown shades.

8. Azodyestuffs of the general formula:

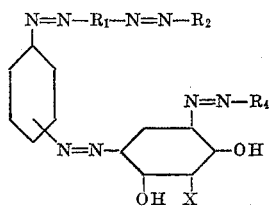

wherein X is a member of the group consisting of hydrogen and N=N—R₅, and R₁ stands for a radical of a 2-amino-5-naphthol-7-sulfonic acid, R₂, R₄ and R₅ stand for aromatic radicals, yielding on leather in general brown to blackish brown shades.

9. The dyestuff having in the free state the following formula:

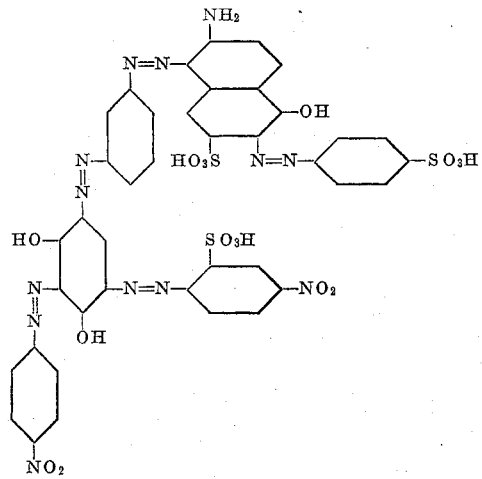

yielding on leather blackish brown shades of good fastness properties.

FRIEDRICH SCHUBERT.